United States Patent Office 3,052,651
Patented Sept. 4, 1962

3,052,651
METHOD OF ACCELERATING THE RATE OF FORMATION OF BUTADIENE POLYMERS IN AQUEOUS EMULSION
George B. Sterling, Midland, Mich., assignor to The Dow Chemical Company, Midland, Mich., a corporation of Delaware
No Drawing. Filed Nov. 17, 1958, Ser. No. 774,101
6 Claims. (Cl. 260—63)

This invention concerns a method and agent for accelerating the rate of formation of butadiene polymers in aqueous emulsion polymerizations.

It is an object of the invention to provide a method and agent for accelerating the rate of polymerization of butadiene and mixtures of butadiene with other monoethylenically unsaturated vinylidene compounds to form rubbery polymers in aqueous emulsion polymerizations. Another object is to provide an improved method for carrying out the emulsion polymerization of butadiene or mixtures of butadiene and other monoethylenically unsaturated vinylidene compounds to produce synthetic rubbers. Other and related objects will appear from the following description of the invention.

According to the invention the foregoing and related objects are obtained by carrying out the polymerization of butadiene or mixtures of butadiene and one or more mono-ethylenically unsaturated vinylidene compounds to form synthetic rubber or rubber-like polymers in an aqueous emulsion in the presence of from 0.195 to 0.205 percent by weight of urea, based on the total weight of the polymerizable monomers initially used.

Peculiarly, it has been found that urea has a specific action for accelerating the rate of polymerization of butadiene or mixtures of butadiene and other monoethylenically unsaturated vinylidene compounds to form synthetic rubber or rubbery polymers, particularly, when the polymerization is carried out in an aqueous neutral to alkaline emulsion employing a water-soluble peroxy polymerization catalyst such as sodium persulfate, potassium persulfate, ammonium persulfate, hydrogen peroxide, sodium perborate and the like, whereas urea derivatives, e.g. methyl urea or thiourea, have little, or no accelerating action on the rate of polymerization under otherwise similar polymerization conditions.

The monomeric material polymerized to produce synthetic rubber or rubber-like polymers by the method of this invention can be butadiene or mixtures of butadiene and one or more monoethylenically unsaturated vinyl or vinylidene compounds such as monovinyl aromatic hydrocarbons or nuclear halogenated monovinyl aromatic hydrocarbons of the benzene series, e.g. styrene, vinyltoluene, vinylxylene, ethylvinylbenzene, isopropylstyrene, tert.-butylstyrene, ar-chlorostyrene, dichlorostyrene, or methyl vinyl ketone, methyl isopropenyl ketone, acrylonitrile, methyl acrylate, ethyl acrylate, butyl acrylate, methyl methacrylate, butyl methacrylate, vinylidene chloride, or mixtures of any two or more of such monoethylenically unsaturated organic compounds and butadiene. The butadiene can be employed in proportions of from about 40 to 100 percent by weight of the monomer initially used and correspondingly with from about 60 to zero percent by weight of one or a mixture of two or more of the monoethylenically unsaturated compounds.

The polymerization is carried out in an aqueous neutral to alkaline emulsion employing an "oil in water" type emulsion wherein the monomers constitute the dispersed phase and the water is the continuous phase. The monomers and water are usually employed in ratios of from 1:1 to 1:4, i.e. in amounts such that the resulting latex contains from about 20 to 50 percent by weight of copolymer, but other proportions can be used.

In preparing the synthetic rubbers by the process of the invention it is usually desirable to use a modifying agent, as is usually true in other emulsion polymerizations to produce synthetic rubber. Preferred modifying agents are alkyl mercaptans which may be primary, secondary or tertiary alkyl mercaptans having from 8 to 16 carbon atoms in the molecule. Mixtures of the alkyl mercaptans can also be used.

Emulsifying agents which are applicable in the process are potassium laurate, potassium oleate, sodium or potassium salts of rosin acids, sodium or potassium salts of alkyl aromatic sulfonic acids, sodium or potassium salts of alkyl sulfates and the like, either alone or in admixture with one another. The emulsifying agents are usually employed in amounts of from 0.5 to 5 percent by weight of the water used.

The pH of the aqueous emulsion can be varied over a wide range without producing deleterious effects on the conversion rate, but is generally in the neutral to alkaline range, and preferably between 8 and 12.

The polymerization can be carried out at from room temperature or thereabout up to 110° C., preferably at from 40° to 100° C. and at superatmospheric pressures. It is generally desirable to carry out the polymerization under the pressure of the reactants, i.e. at the autogenous pressure of the mixture of the materials, at the temperatures employed, although greater pressures can be used.

The following examples illustrate ways in which the principle of the invention has been applied, but are not to be construed as limiting its scope.

EXAMPLE 1

In each of a series of experiments, a mixture of 60 percent by weight of butadiene, 20 percent of methyl isopropenyl ketone and 20 percent of acrylonitrile was heated for a period of one hour at a temperature of 60° C. in an aqueous emulsion employing the recipe:

| Ingredients: | Parts by weight |
|---|---|
| Monomers | 100 |
| Water | 110 |
| Duponol WAQ (fatty alcohol sodium sulfate) | 3.03 |
| Tert.-dodecyl mercaptan | 0.5 |
| Potassium persulfate | 0.75 |
| NaHCO$_3$ | 1.0 |
| Urea | Variable |

The mixture of materials was placed in a glass pressure-resistant bottle and sealed, then agitated to effect emulsification and heated with agitation at a temperature of 60° C. for a period of one hour. Thereafter, the bottle and its contents were cooled. The latex was removed from the bottle and was coagulated. The copolymer was recovered by filtering, was washed with water and was dried. Table I identifies the experiments and gives the proportions of the monomers employed. The table also gives the amount of urea expressed as percent by weight of the total weight of the monomers initially used. The table also gives the percent yield or percent conversion of the monomers to polymer obtained in the reaction.

For purpose of comparison, experiments with no urea added, and with urea in amounts outside the scope of the invention, were carried out under otherwise similar conditions. In the table the symbols "C$_4$H$_6$," "VCN" and "MIK" are employed to represent butadiene, acrylonitrile and methyl isopropenyl ketone, respectively, for brevity.

Table I

| Run No. | Starting Materials | | | | Reaction Conditions | | Polymer—Conversion, Percent |
|---|---|---|---|---|---|---|---|
| | C₄H₆, Percent | VCN, Percent | MIK, Percent | Urea, Percent | Temp., Percent | Time, Hrs. | |
| 1 | 60 | 20 | 20 | 0 | 60 | 1 | 33.5 |
| 2 | 60 | 20 | 20 | 0.19 | 60 | 1 | 32.7 |
| 3 | 60 | 20 | 20 | 0.20 | 60 | 1 | 48.5 |
| 4 | 60 | 20 | 20 | 0.21 | 60 | 1 | 31.4 |
| 5 | 60 | 20 | 20 | 0.25 | 60 | 1 | 32.7 |

EXAMPLE 2

In each of a series of experiments, a mixture of 60 percent by weight of butadiene, 20 percent of methyl isopropenyl ketone and 20 percent of acrylonitrile was heated and stirred for a period of one hour at a temperature of 60° C. in an aqueous emulsion employing a recipe and procedure similar to that employed in Example 1. In the experiments, a polymerization was carried out in the presence of 0.20 percent by weight, based on the total weight of the monomers initially used, of urea, thiourea, methyl urea and in the absence of any added urea or urea derivative. Table II identifies the experiments and gives the percent of urea or urea derivative employed in the experiment. The table also gives the yield or percent conversion of the monomers to polymer.

Table II

| Run No. | Promoter | | Product—Conversion, Percent |
|---|---|---|---|
| | Kind | Percent | |
| 1 | none | | 33.5 |
| 2 | Urea | 0.20 | 50.0 |
| 3 | Thiourea | 0.20 | 26.0 |
| 4 | Methyl Urea | 0.20 | 30.0 |

EXAMPLE 3

A mixture of 70 percent by weight of butadiene and 30 percent of acrylonitrile, together with 0.20 percent by weight, based on the weight of the monomers, of urea, was heated for a period of one hour at 60° C. in an aqueous emulsion employing a recipe and procedure similar to that employed in Example 1. The yield of polymer was 53.5 percent, based on the monomers initially used.

In contrast, when the polymerization is carried out in the absence of urea the conversion is only 35.6 percent.

EXAMPLE 4

The experiments of Example 3 were repeated, except that the polymerization was continued for a period of two hours. The polymerization in the presence of urea gave an 88 percent yield of polymer having a Mooney number M1 1+4 (212° F.) of 210.

In contrast, the polymerization without urea gave only 55 percent of polymer having a Mooney number of 210.

Similar results of increased polymerization rates have been obtained by polymerizing mixtures of 70 percent butadiene and 30 percent styrene, 70 percent butadiene and 30 percent dichlorostyrene, and 60 percent butadiene, 20 percent styrene and 20 percent acrylonitrile, in admixture with 0.20 percent by weight of urea in an aqueous emulsion in accordance with the procedure set forth in the examples.

I claim:

1. A method of accelerating the rate of polymerization of a monomeric material consisting of at least 40 percent by weight of butadiene and not more than 60 percent by weight of at least one other monoethylenically unsaturated vinylidene monomer copolymerizable therewith to form a synthetic rubber while dispersed in an aqueous medium, which method comprises polymerizing said monomeric material while dispersed in the presence of an emulsifying agent in an aqueous medium having a pH between 8 and 12 at polymerization temperatures between 40° and 110° C. in the presence of an water-soluble peroxy generating polymerization catalyst and from 0.195 to 0.205 percent by weight of urea, based on the total weight of the monomeric material initially used.

2. A method as claimed in claim 1, wherein the monomeric material is a mixture of at least 60 percent by weight of butadiene.

3. A method as claimed in claim 1, wherein the monomeric material is a mixture of at least 60 percent by weight of butadiene and not more than 40 percent of styrene.

4. A method as claimed in claim 1, wherein the monomeric material is a mixture of at least 60 percent by weight of butadiene and not more than 40 percent of acrylonitrile.

5. A method as claimed in claim 1, wherein the monomeric material is a mixture of at least 60 percent by weight of butadiene, not more than 20 percent of acrylonitrile and not more than 20 percent of methyl isopropenyl ketone.

6. A method as claimed in claim 1, wherein the monomeric material is a mixture of at least 60 percent by weight of butadiene, not more than 20 percent of methyl isopropenyl ketone and not more than 20 percent of styrene.

References Cited in the file of this patent

UNITED STATES PATENTS

| 1,113,630 | Hofmann et al. | Oct. 13, 1914 |
| 2,380,710 | Stewart | July 31, 1945 |
| 2,430,591 | Stewart | Nov. 11, 1947 |

FOREIGN PATENTS

| 248,399 | Germany | Mar. 24, 1911 |
| 318,115 | Great Britain | Aug. 26, 1929 |

UNITED STATES PATENT OFFICE
CERTIFICATE OF CORRECTION

Patent No. 3,052,651                      September 4, 1962

George B. Sterling

It is hereby certified that error appears in the above numbered patent requiring correction and that the said Letters Patent should read as corrected below.

Column 4, line 22, after "of an" insert -- inorganic --; line 23, strike out "generating".

Signed and sealed this 5th day of March 1963.

(SEAL)
Attest:

ESTON G. JOHNSON                          DAVID L. LADD
Attesting Officer                             Commissioner of Patents